United States Patent [19]

Barnett

[11] 4,264,096
[45] Apr. 28, 1981

[54] TWO HANDLED FREELY PIVOTABLE SCOOP

[76] Inventor: Russell C. Barnett, 52 N. Third St., Fairfield, Iowa 52566

[21] Appl. No.: 89,148

[22] Filed: Oct. 29, 1979

[51] Int. Cl.³ .............................................. B25G 3/38
[52] U.S. Cl. .................................................... 294/58
[58] Field of Search ........................... 294/54, 57, 58; 15/143 R, 144 R, 144 A, 145; 16/114 R

[56] References Cited

U.S. PATENT DOCUMENTS

| | | | |
|---|---|---|---|
| 933,647 | 9/1909 | Hunt | 294/58 |
| 1,374,061 | 4/1921 | Coleman | 294/58 |
| 1,456,879 | 5/1923 | Newman | 294/58 |
| 2,521,441 | 9/1950 | Bickley | 294/58 |
| 2,826,835 | 3/1958 | O'Shea | 294/58 X |
| 4,103,954 | 8/1978 | Vaslas | 294/58 X |

FOREIGN PATENT DOCUMENTS

| | | | |
|---|---|---|---|
| 410274 | 3/1925 | Fed. Rep. of Germany | 294/58 |
| 165574 | 3/1950 | Fed. Rep. of Germany | 294/58 |

*Primary Examiner*—Johnny D. Cherry
*Attorney, Agent, or Firm*—Zarley, McKee, Thomte, Voorhees & Sease

[57] ABSTRACT

The scoop of the present invention allows the user to avoid back fatigue caused by bending and side muscle fatigue caused by the lack of free pivotal movement of an auxiliary handle. The scoop is comprised of a blade with a longer main handle attached to the blade and a shorter leverage handle having an eye bolt at one end which is attached to the eye of a second eye bolt extending through the front face of the scoop and through the first or main handle. The unit is freely pivotable in all directions and provides increased stability because the auxiliary or shorter leverage handle is hooked directly to the scooping blade.

1 Claim, 3 Drawing Figures

TWO HANDLED FREELY PIVOTABLE SCOOP

BACKGROUND OF THE INVENTION

This invention relates to an improvement in two handled scoop shovels, particularly snow shovels. It provides for an improvement in such shovels which decreases the amount of bending required by the user and which minimizes the risk of side strain. These are accomplished by a two handed scoop shovel which has its auxiliary or shorter leverage handle freely pivotable and at least partially rotatable in any direction desired by the user. Having the auxiliary or leverage handle attached directly to the blade provides increased leverage power without further back strain.

While two handled scoop shovels have heretofore been provided, see for example, U.S. Pat. Nos. 1,586,056, 2,826,835 and 4,050,728, no such device having the features as shown herein has heretofore been provided.

For example, in U.S. Pat. No. 4,050,728, a complex device is shown employing a universal joint for the auxiliary handle with the result being that the unit is pivotable only in one perpendicular and one horizontal plane. Moreover, the unit is not attached directly to the scooping blade. Walsh, U.S. Pat. No. 1,586,056, shows an auxiliary handle which is attached to the first handle and allows for pivotable movement only in a single plane. O'Shea, U.S. Pat. No. 2,826,835 shows an auxiliary handle which does not hook directly to the scooping blade, but rather hooks to the first handle with the result being that the leverage is substantially impaired.

Accordingly, the objects of applicant's invention are to provide a two handed shovel with the auxiliary handle being freely movable in any plane desired, and to some extent at least partially rotatable with the auxiliary handle being attached directly to the scooping blade for increased leverage. The result is back bending is minimized, and side or lateral strain is also significantly reduced.

The method and manner of accomplishing each of these objects, as well as others, will become apparent from the detailed description of the invention which follows.

DETAILED DESCRIPTION OF THE INVENTION

Figure 2:
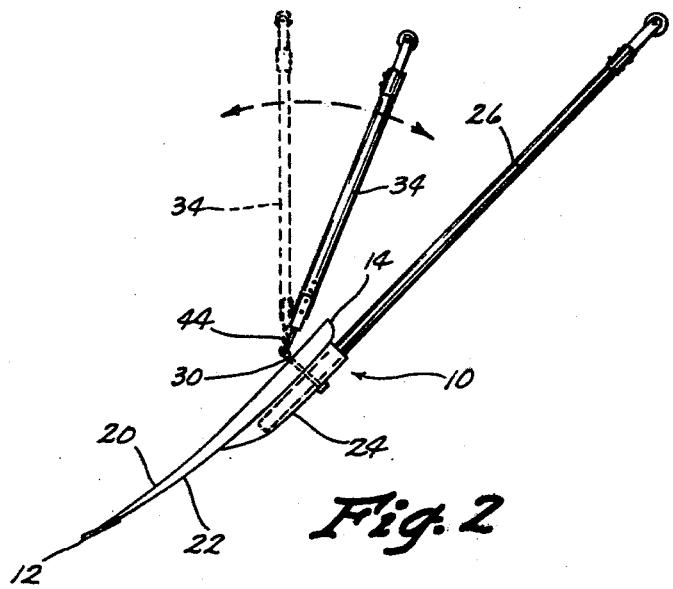
FIG. 2 is a side elevational view of the shovel of this invention.

With continual reference to the drawings, the improved two handled scoop shovel is comprised of a blade 10 having a longitudinal bottom edge 12, and a spaced apart longitudinal top edge 14 with side edges 16 and 18 extending therebetween. Blade 10 has a front or facing side 20 and a back side 22. As seen in FIG. 2, on the back side 22 of the blade 10 adjacent top edge 14, a handle insert sleeve 24 is joined to back side 22.

A longer main handle 26 has its forward end inserted into sleeve 24 and has at its rear end hand grip 28.

A first eye bolt 30 extends through the front face 20 of blade 10 and through the forward position of main handle 26 to firmly attach handle 26 in its position in sleeve 24 to blade 10. Eye 32 projects upwardly from the face 20 of blade 10.

Figure 1:
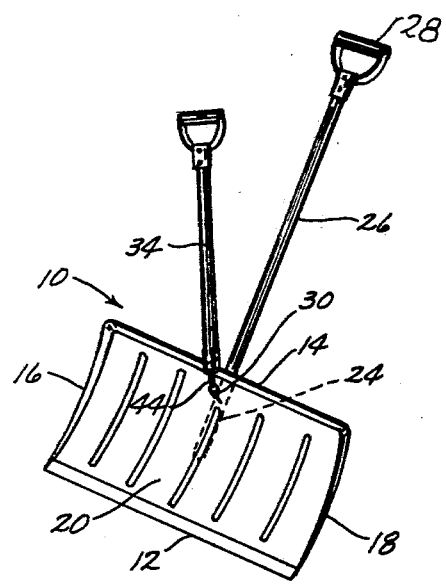
FIG. 1 is a perspective view of the shovel of this invention.
Figure 3:
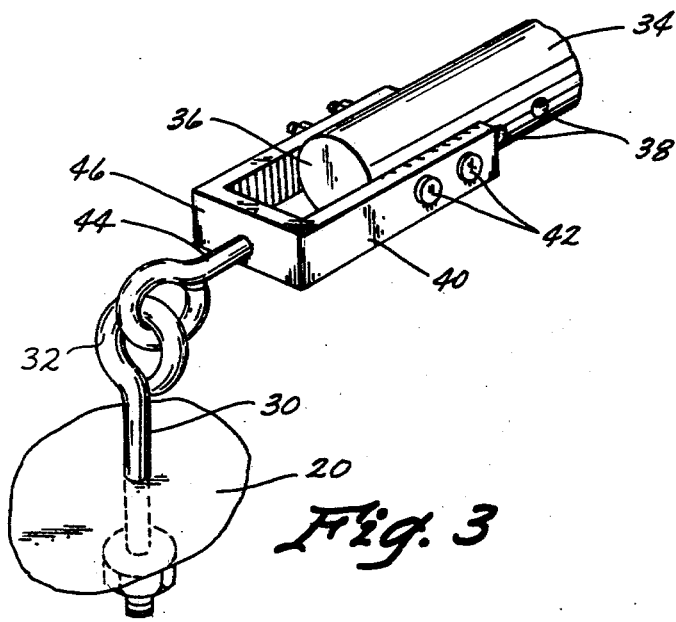
FIG. 3 is an enlarged elevated perspective view showing the attachment of the auxiliary handle to allow free movement in any desired plane, and to allow partial rotatable movement.

The auxiliary handle 34, sometimes referred to as "shorter leverage handle 34" is best seen in FIGS. 1 and 3. At the forward end 36 of auxiliary handle 34 is a plurality of transversely extending bores 38 to provide adjustability for the length of handle 34.

U-shaped bracket 40 fits over the forward end 36 of auxiliary handle 34 and bolts 42 extend through bores 38 to attach bracket 40 to handle 34. As best seen in FIG. 3, U-shaped bracket 40 has a forwardly projecting eye bolt 44 attached to its base.

The eye 44 of leverage handle 34 and eye 32 are attached, one to the other, as best depicted in FIG. 3. The result is that handles 34 and 26 are both attached directly to blade 10.

It can therefore be seen that auxiliary handle 34 is freely movable in any desired perpendicular or horizontal plane. Additionally, it is at least partially rotatable. This fact of free lateral and perpendicular movement, coupled with at least partial rotatability minimizes side strain to the user. The fact that the auxiliary handle is attached directly to the scooping blade 10 provides for increased leverage support with the result being that the user does not need to bend.

If desired to be used as a conventional scoop, handle 34 may be secured to handle 26 by a clip means with handle 26 only being used for operating.

It can therefore be seen that the invention accomplishes at least all of its stated objects.

What is claimed is:

1. A scoop comprising:
   a blade having a pair of longitudinal top and bottom edges, and spaced apart side edges extending therebetween, front and back sides, and a handle insert sleeve attached to the back side of said blade adjacent to said top edge,
   a longer main handle, one end of which is fitted into said insert sleeve,
   a first eye bolt extending through the front face of said blade, through said insert sleeve, and secured to said main handle, with its eye projecting upward from the front face of said blade and aligned perpendicular to the longitudinal axis of said main handle,
   a shorter rigid leverage handle with opposite ends, one of said ends having a hand grip along the transverse axis of said leverage handle and one of said ends having a securing means for directly attaching said leverage handle to said blade of said scoop, and a plurality of spaced apart bores extending therethrough,
   said securing means being a U-bracket adjustably attached to one of said leverage handle ends with the base portion of said U-bracket having a second eye bolt with the eye of said second eye bolt projecting outward from the end of said leverage handle, aligned perpendicular to the transverse axis of said leverage handle and attached to the eye portion of said first eye bolt, and with a plurality of spaced apart bores extending through the flanges of said U-bracket, whereby said U-bracket bores may be aligned with said leverage handle bores and secured thereto.

* * * * *